H. W. COLBY.
BARREL FILLING MACHINE.
APPLICATION FILED DEC. 30, 1905.

959,463.

Patented May 31, 1910.
5 SHEETS—SHEET 1.

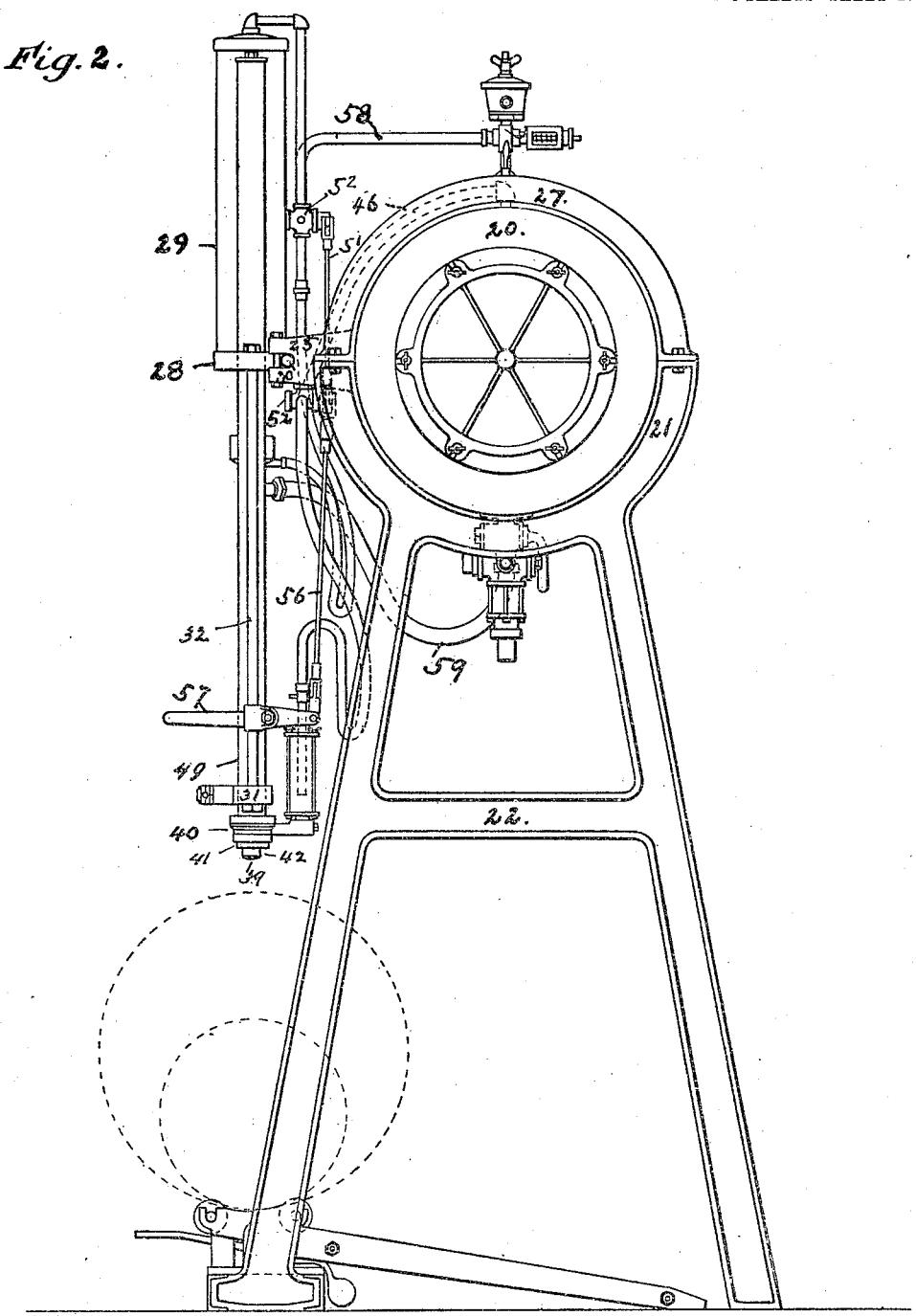

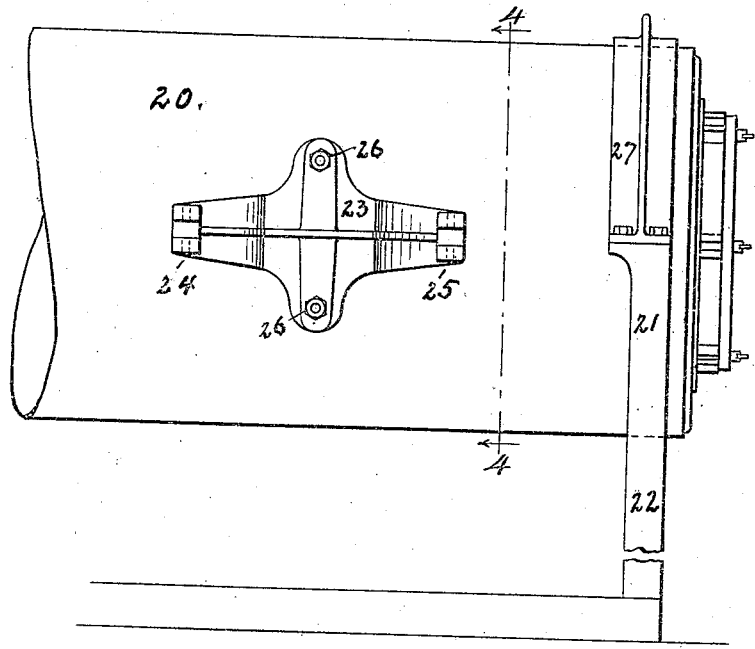
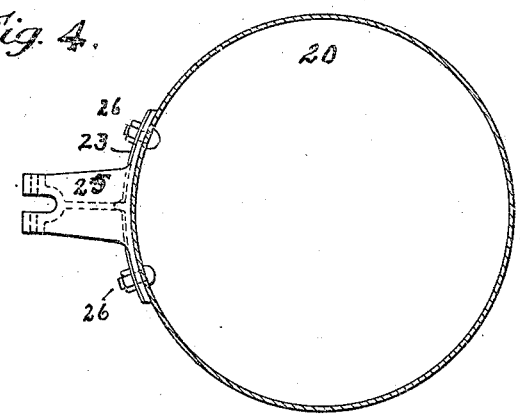

H. W. COLBY.
BARREL FILLING MACHINE.
APPLICATION FILED DEC. 30, 1905.

959,463.

Patented May 31, 1910.
5 SHEETS—SHEET 4.

Witnesses:
Wm. Geiger
Pearl Abrams

Inventor:
Harry W. Colby
By Munday, Evarts & Adcock
Attorneys

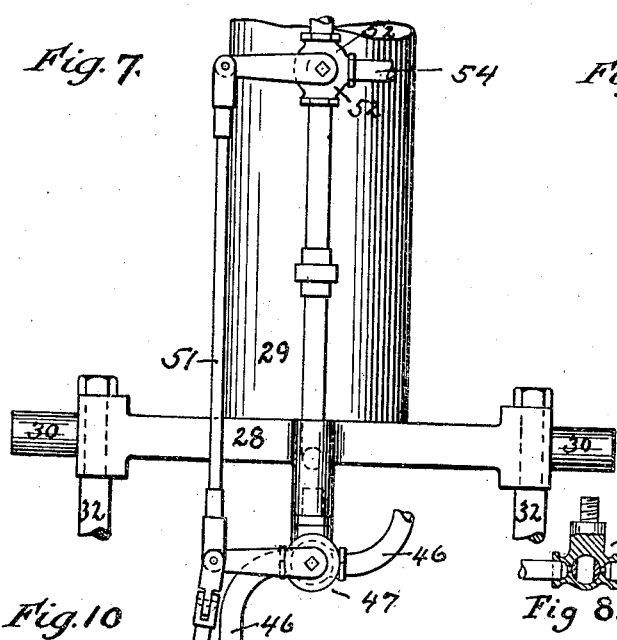
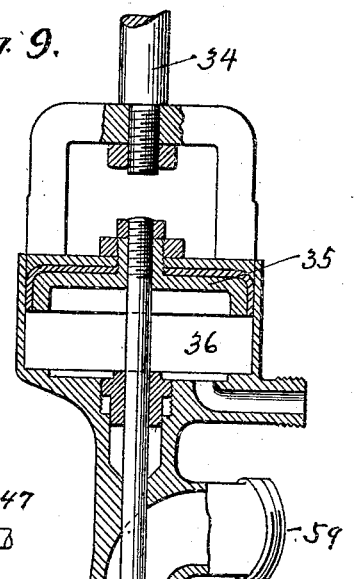
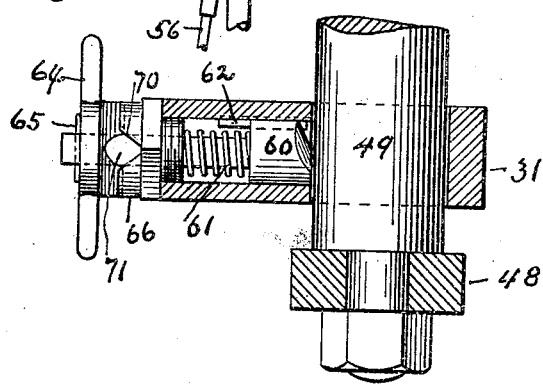
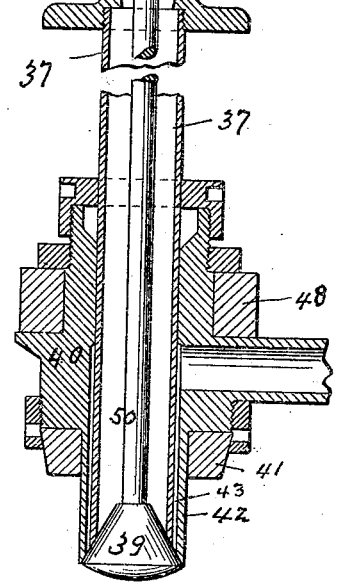
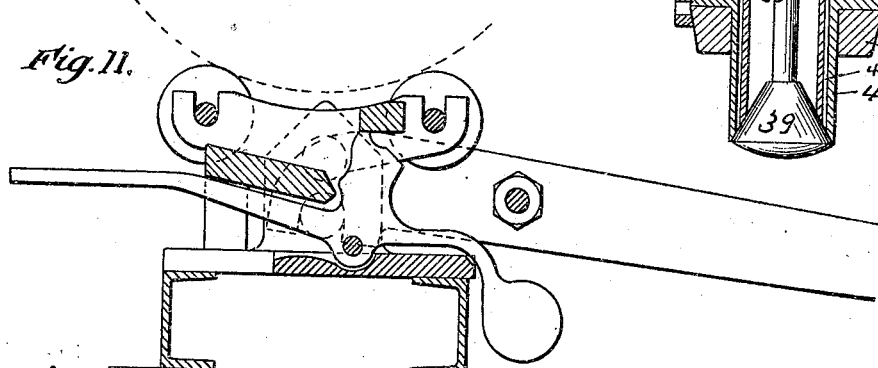

UNITED STATES PATENT OFFICE.

HARRY W. COLBY, OF CHICAGO, ILLINOIS, ASSIGNOR TO AUTOMATIC RACKING MACHINE COMPANY, OF CHICAGO, ILLINOIS, A CORPORATION OF ILLINOIS.

BARREL-FILLING MACHINE.

959,463.  Specification of Letters Patent.  Patented May 31, 1910.

Application filed December 30, 1905. Serial No. 293,882.

*To all whom it may concern:*

Be it known that I, HARRY W. COLBY, a citizen of the United States, residing in Chicago, in the county of Cook and State of Illinois, have invented a new and useful Improvement in Barrel-Filling Machines, of which the following is a specification.

This invention relates to an improvement in the construction and operation of a machine for filling barrels with beer, sometimes called a racking machine.

The object of the invention is to simplify and cheapen the construction of the machine, to increase its efficiency, simplify its operation and save time and power in its employment.

The invention consists in the means I employ to practically accomplish this object or result, which means will be more fully set forth in the subjoined description and claims, taken in conjunction with the accompanying drawings which form a part of this specification.

Figure 1:
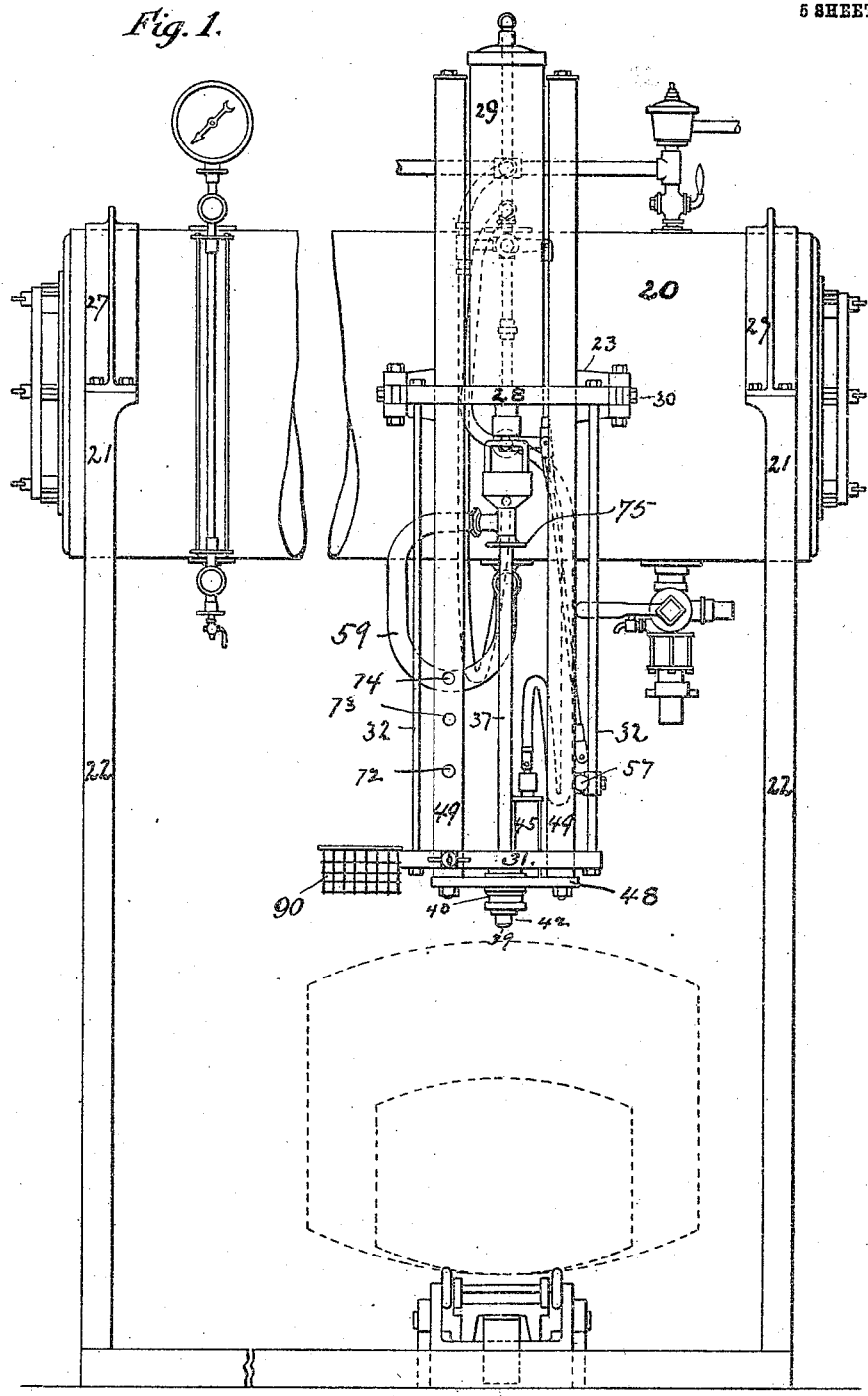
Figure 5:
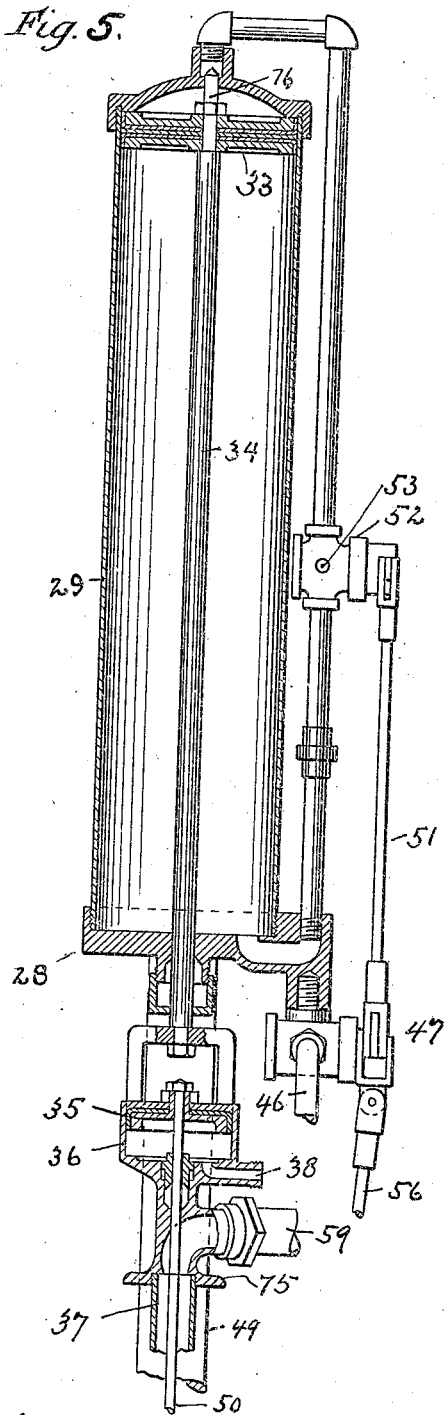
Figure 6:
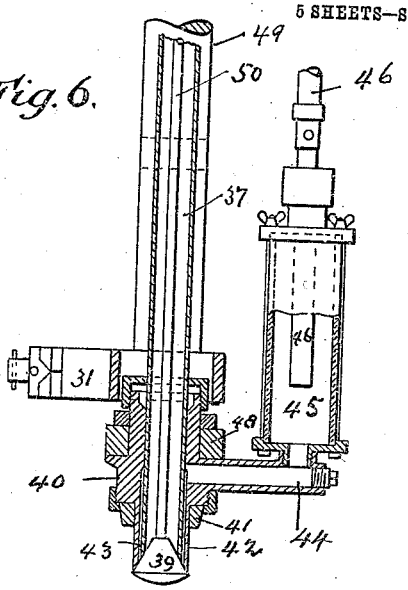

In said drawings, Figure 1 is a front elevation of one of my improved barrel filling machines; Fig. 2 is a side elevation of the same. Fig. 3 is a front elevation of a portion of the tank and framework showing the supporting saddle-bracket as a means for connecting the mechanism to the tank. Fig. 4 is a fragmentary section on the line 4—4 of Fig. 3. Figs. 5 and 6 is a section of the cylinder, filling tube and sealing head,—Fig. 6 being a downward continuation of Fig. 5,—the dotted portion under Fig. 6 indicating the lowermost position of the filling tube and sealing head when engaged with the barrel. Fig. 7 shows a rear view of the lower portion of the cylinder, showing the valves connected together; Fig. 8 is a sectional view of the lower valve in Fig. 7. Fig. 9 is a sectional view of the piston rod, its connection to the filling tube, the filling tube and the sealing head shown being somewhat enlarged. Fig. 10 is a detail sectional view of the automatic stop or detent for controlling the position of the sealing head with respect to barrels of different sizes. Fig. 11 is an enlarged sectional view of the barrel support.

In said drawings, 20 is the tank for holding the beer or other carbonated liquid under pressure of its contained gases. This tank is supported at each end in the cast iron saddle 21 mounted on the A shaped frame-work 22. It has been customary in machines of this class heretofore to provide horizontal stringer pieces extending from one of the frame pieces 22 to the other, and to mount the barrel filling mechanism upon such stringer piece.

In order to cheapen the construction and to save room in the present machine, I connect the filling mechanism directly to the tank itself through the medium of a bracket saddle 23—shown more fully at Figs. 3 and 4. The two arms 24—25 of this bracket saddle extend out just far enough to receive the trunnions of the filling mechanism and to permit said filling mechanism to swing away properly from the bung hole of the barrel below. The bracket 23 may be simply bolted to the side of the tank by the two bolts 26. In order to prevent the tank from turning under the weight of the filling mechanism thus supported upon it, I provide the upper half ring 27 bolted to the saddle or lower half ring 21 so that the tank is clamped between these two parts, and where an extra large number of filling tubes are to be supported from the same tank, this clamping may be supplemented by bolting the lower half of the saddle to the tank, though it is preferable to rely upon the clamping of the rings if that can be done.

Referring to Figs. 1, 2 and 7, the swinging framework upon which the filling mechanism is mounted will be understood. This framework consists of the cross supporting bar 28 upon which is mounted the motor cylinder 29. This cross bar 28 is provided at each end with a trunnion 30 journaled in the bracket 23. At a considerable distance below is the second supporting cross bar 31 and the two bars are connected together by bolt rods 32. The framework thus far described, consisting of the parts 28, 31 and 32 is not movable up and down, but swings upon its trunnions. I shall now describe the motor cylinder 29, and the parts connected therewith. As before indicated, this motor cylinder is supported upon the frame bar or support 28, and consequently can be swung or oscillated upon the trunnions 30. This cylinder, preferably operated by compressed air, contains the piston 33, see Fig. 5, the piston rod 34 of which passes out through a stuffing box at the lower end of the cylinder and is connected to the plunger 35 of a dash-pot 36, which dash-pot in turn is attached to and supports the upper end of the filling tube 37. The dash-pot 36 by a pipe 38 is connected to the compressed air supply so that the air pressure in the dash-pot is always the same as the air pressure in the cylinder, but as the area of the cylinder piston is much greater than the area of the dash-pot piston, the superior force of the cylinder piston will overcome the resistance of the dash-pot piston when the filling tube has reached the limit of its downward movement, thus permitting the piston rod of the cylinder to continue to descend until the plunger of the dash-pot has reached the limit of its downward movement. It is this additional movement of the piston of the cylinder in pushing the dash-pot piston home, that is taken advantage of to open the valve 39 at the lower end of the filling tube, and which is thus opened, as will be understood, after the filling tube has reached its lowermost position where its lower end will be near the bottom of the barrel, as indicated in the dotted continuation of Fig. 6. Surrounding the filling tube 37 and with an air tight connection between the two is the sealing head 40, so constructed that the filling tube can slide through it in the usual manner. This sealing head is provided with a rubber gasket 41 which rests on the bung hole of the barrel and forms a tight connection. Within this gasket the sealing head extends downward into the bung hole of the barrel in the form of a tube 42, which is chambered to permit the passage of air between the walls of the sealing head and the surface of the filling tube through the space 43, which space is connected to the air tube 44 in turn connected to the regulating gage 45, in turn connected by the pipe 46 through the controlling valve 47 to the compressed air supply in the tank.

The operation of the regulating gage 45 is familiar to those skilled in the art, and it is unnecessary to describe it here, except to state that the compressed air supply to the barrel and the escape of this compressed air from the barrel as the latter is filled, passes through this device and through the passage 43. The lower end of the tube 42 is so ground and fitted as to form an annular seat for the exterior portion of the conical plug valve 39, which plug is also seated in the lower end of the filling tube; thus the same plug serves to close both the filling tube and the air tube 42 when the filling tube is raised in its uppermost position. And it will thus be seen that so long as the filling tube is in this uppermost position, no air can escape from the tank through the sealing head, even though the valve 47 should be open. And this condition will continue also until the filling tube is given a downward motion independent of the sealing head, to cause the plug valve 39 to separate from its seat on the lower end of the air tube.

The sealing head, of course, has some weight of its own, but to give it sufficient weight to cause it to descend and firmly seal the bung-hole, it is provided with the cross-bar 48 upon which are mounted the vertical cylindrical weights 49 which pass through holes in the supporting bar 28 freely enough to slide up and down through them. It may be noted that the weight of the sealing head and these parts always keep the valve 39 firmly closed so long as said weight is supported by the valve plug and its stem 50. The valve stem 50 is connected directly to the plunger 35 of the dash-pot 36, and so through these means is connected to and moves with the piston rod 34 of the motor cylinder. Now when the piston rod 34 is lowered through the action of said motor cylinder and its piston, the filling tube and its plug valve 39 and the sealing head and its weights supported upon said plug valve, descend together simultaneously until the sealing head encounters the barrel and the gasket 41 is firmly seated on the bung hole by the gravity of the sealing head and its weights. Now the sealing head can no longer descend, and the filling tube continuing its descent carries the plug valve 39 down and opens the end of the air tube so that—the valve 47 being open—the air from the tank as soon as the sealing head is seated immediately begins to flow into the barrel to fill the same with compressed air and continues to flow while the filling tube is descending so that in practice the barrel will be found to be sufficiently filled with compressed air to permit the beginning of the flow of beer thereinto as soon as the filling tube has reached its proper lowermost position to begin the flow. This enables the saving of an important amount of time, and it also enables me to arrange the valves for controlling the cylinder and the air pipe so that they can both be operated by a single movement of the operator and be followed by the above described automatic action. In order that this may be more fully understood, I will now proceed to describe the valves just mentioned more particularly. The valve 47 for controlling the air pipe 46 is shown at Fig. 7 and in section at Fig. 8. This valve 47 is connected by a rod 51 to the valve 52, the latter having an exhaust port 53. These valves 47 and 52 are both connected to the compressed air supply, the former by the pipe 46 and the latter by the pipe 58, and their ports are so arranged relatively to each other that when the valve 52 is turned in position to admit air to the upper end of the cylinder, to force the piston downward, or when said valve 52 is closed against admission of air to either end of the cylinder, the other valve 47 stands open; but when the valve 52 is turned so as to admit air to the lower end of the cylinder to cause its piston to rise, then during such rise, the valve 47 will stand closed.

In operation, when the operating arm of the valve 47 stands in the horizontal position indicated in Fig. 7, and the operating arm of the valve 52 stands in a similar position, the valve 47 is open and the valve 52 is closed. When the operating arm of the valve 47 is lifted through an arc of say, forty-five degrees, and the operating arm of the valve 52 is similarly lifted, the valve 47 stands open and the valve 52 stands open for admission of air to the upper end of the cylinder and exhaustion of air from the lower end, and when the operating arm of the valve 47 is swung down to a position below the horizontal and the operating arm of the valve 52 swung down to a similar position, the valve 47 will be closed and the valve 52 open for admission of air to the lower end of the cylinder and exhaustion from the upper end thereof. The construction and arrangement of the parts of these two valves to accomplish this operation will be readily understood by those familiar with valve construction. The operating arm of the valve 52, as before pointed out, is connected directly by means of the connecting rod 51 with the operating arm of the valve 47, and this latter operating arm is connected by means of the rod 56, see Fig. 2, to the inner end of the hand lever 57. It will thus be seen that a downward movement of the outer end of the hand lever 57 will cause the filling tube to descend, and an upward movement of said handle will cause the filling tube to rise and the median position of said handle will permit the filling tube to remain stationary and cut off all air from the cylinder while the valve 47 will be open for admission of air to the barrel. The hand lever 57 is pivoted to one of the rods 32 of the swinging frame and is thus in position to be reached at all times by the operator.

It will be noted that the trunnions 30—30 connected to the cross supporting bar 28, or lower portion of the cylinder, are set back somewhat out of the vertical central line of the mass of the filling mechanism. Consequently, the weight of the said filling mechanism being principally in the cylinder and its parts, tends to swing the frame on its trunnion axis in such manner that the sealing head when lifted and the frame allowed to oscillate, the lower parts will swing back toward the tank, away from the bung hole, thus leaving the latter free for the driving of the bung. And when a fresh barrel has been presented, the operator, standing in front and taking hold of the handle 57 can pull the weight of the filling apparatus forward toward him to center it with the bung, and at the same time depress the lever and thus start the sealing head and filling tube downward to engage the barrel.

A more detailed statement of the connections for compressed air and beer is as follows: Compressed air passes from the tank 20 through the pipe 58 and the valve 52 to the cylinder. Compressed air passes from the tank through the pipe 46 by way of the valve 47, the regulator 45 and pipe 44 and air passage 43 to the package and from the package to the tank. Beer flows from the tank to the filling tube and thus to the package through the pipe 59, and compressed air passes between the tank and the dash-pot 36 through the pipe 38. The pipes or connections 58, 46, 38 and 59 between the stationary tank and the parts mounted on the swinging frame are made flexible to permit the necessary movement of the filling mechanism—the swinging in and out, and the up and down movement.

The barrels or packages, as indicated in dotted lines at Figs. 1 and 2, are of different sizes. Sometimes a full barrel is to be filled, and sometimes a quarter or eighth barrel. And while the bottom of the barrel mounted on a support common to all sizes— is always in the same position, or at the same height from the ground, the bung hole or place where the sealing head is to rest is at varying heights from the barrel support, according to the different sizes of the barrels.

When ready to present a barrel for filling, the normal or ready position of the mechanism is with the piston at the top of the cylinder as indicated in Fig. 5, and the filling tube and sealing head lifted to its uppermost position as indicated in Figs. 1 and 2. Now when filling barrels of the largest diameter, it will be seen that the sealing head from this highest position is required to descend only a short distance before it encounters the barrel, though of course, the filling tube has to descend to the lower part of the barrel. But when a small barrel is being filled, the sealing head is required to descend from this highest position a very much greater distance before it can rest upon the surface of the smaller barrel. The consequence is that if the sealing head is to be returned at the filling of each small barrel to its uppermost position, a considerable and unnecessary expenditure of time and power is required. To obviate the necessity of this extended movement, I provide a spring catch or detent 60 which is mounted on the lower bar 31 of the swinging frame and the inner end of this detent bears against the surface of one of the cylindrical weights 49. The end of this detent is beveled or latch-shaped, as will be seen by reference to Fig. 10. And this latch-shaped plug or detent is compressed toward the weight 49 by means of the coiled spring 61. A feather or spline 62 in a key-way on the upper side of the latch prevents said latch from turning or getting out of position, as it is necessary that the bevel shall be on the upper side. The latch is provided with the handle 64, said handle being loosely applied to the end of the rod and secured in place by a cotter pin 65. In the plug 66 which closes the cavity containing said latch is formed a wedge shaped depression 70, and attached to the handle 64 is a correspondingly shaped wedge 71. By turning the handle until the wedge assumes the position shown in Fig. 10 so that the blade of the wedge is at right angles to the apex of the cavity, the latch will be withdrawn against the spring and so held and will be and remain out of action. But when the handle is turned through a quarter revolution and the apex of the wedge brought in line with the apex of the cavity, the spring will force the latch against the surface of the weight 49 and the latch will be in proper position to act as a detent.

In the weight 49 at proper positions are formed holes 72, 73, 74 to receive the end of the latch. Now when the barrels of largest diameter are to be filled, the downward movement of the sealing head is not sufficient to bring the lowermost hole 72 opposite the latch, so that in the filling of the largest size barrel, the latch is entirely inactive. But in the filling of the other sizes of barrels, the latch is caused to engage with one or other of these holes to stop or limit the upward movement of the sealing head and filling tube. Thus, suppose the smallest size barrel is to be filled. The sealing head will be caused to descend from its highest position until it encounters the barrel, and in order to permit this the beveled upper edge of the latch will cause the latch to slip by all of the holes 72, 73, 74. But when, after this small barrel has been filled and the filling mechanism is to be moved from the barrel, the piston rising in the cylinder first withdraws the filling tube until the conical plug valve at the lower end of the filling tube encounters the air tube of the sealing head when the further movement of the piston will also lift the sealing head and its attached weights. And now the surface of the weight 49 will slide on the latch until the first hole is brought opposite said latch whereupon the latch will enter the hole and stop the further rise of the sealing head and consequently any further rise of the piston. By this simple device, the movement of the piston and its attached parts is limited in the case of every sized package to just sufficient movement to do the work required and the unnecessary loss of time due to unnecessary movement is obviated.

Upon the filling tube is placed a flange or stop 75 sufficiently large so that it cannot pass through the opening in the frame piece 31 and so to act as a positive stop to prevent the downward movement of the filling tube below a certain limit. When this stop and downward limit has been reached, the lower extremity of the filling tube should be near the bottom of the barrel to be filled, and the valve should be ready to open. And the valve is opened by a further downward movement of the piston, which now by reason of the resistance to the further downward movement of the filling tube offered by the stop, is able to force down the piston 35 in the dash-pot 36 and force the air out of said dash-pot back into its source of supply by reason of the greater area of the piston 33 over the area of the piston 35; and thus the valve rod being carired down, the valve at the foot of the filling tube is properly opened. This dash-pot in addition to the function above described, operates as a buffer or relieving spring to relieve the shock of the down stroke of the piston when the filling tube comes to a stop. The shock at the close of the upper stroke of the piston 33 which might occur if the piston were allowed to strike against the head of the cylinder with force, is prevented by means of the pin 76 which projects from the upper surface of the piston 33 and enters the port through which the air above said piston is being exhausted, and partially closes this orifice, and thus compresses the air between the piston and the upper cylinder head and makes of such a cushion to resist the too rapid movement of the piston and thus to relieve the shock. The rectangular checkered portion at the left hand end of the bar 31, and indicated by the numeral 90 represents the ordinary wire net bung basket, to hold the bungs.

I claim:—

1. In a barrel filling machine, the combination and arrangement of a motor cylinder, and its piston, a filling tube and a sealing head, a tank for holding the beer under gaseous pressure, a beer communicating pipe between the tank and the filling tube, an air communicating pipe between the tank and the sealing head, a valve in this pipe, an air communicating pipe from the source of power to the cylinder, and a valve in this latter pipe, a rod or connection between these two valves so that they shall operate simultaneously, said rod being connected to a hand lever, a valve at the foot of the filling tube so constructed that when said tube is raised to its upper position, said foot valve will close both the filling tube and the air supply between the tank and the barrel and open the same when the filling tube is lowered, and means for automatically opening the valve at the lower end of the filling tube when the latter reaches its lower position, whereby by a single movement of the hand lever in one direction, the filling tube and sealing head may be caused to descend and engage the barrel, the air communication between the tank and the barrel be opened and thereafter the beer communication between the tank and the barrel also be opened, and by a single movement of the hand lever in the other direction, the beer communication and air communication be closed and the filling tube and sealing head lifted out of engagement with the barrel, all substantially as specified.

2. In a barrel filling machine comprising a sealing head and a filling tube telescoping therethrough, a motor cylinder and piston for raising and lowering the filling tube, a dash-pot having a piston of lesser area and interposed between the motor cylinder and the filling tube and a stop on the filling tube to limit its descent, and a valve at the lower end of the filling tube connected to the dash-pot piston rod, whereby the motor cylinder will act to lower the filling tube and subsequently to open the valve and in the reverse action to close the valve and raise the filling tube, substantially as specified.

3. In a barrel filling machine, the combination of the tank, the filling tube, the cylinder and piston for moving said filling tube up and down, the sealing head lifted by the filling tube and lowered by gravity, the framework for supporting the sealing head and filling tube, and a latch for automatically limiting the upward movement of the sealing head and filling tube in different positions whereby the apparatus may be used upon barrels of varying diameters without loss of time, substantially as specified.

4. In a barrel filling machine, the combination of a filling tube, a cylinder and piston for operating the filling tube, a sealing head, weights for holding the latter down, a frame-work upon which this mechanism is supported and mounted upon trunnions placed at one side of the vertical center of gravity whereby the weight of the mechanism itself when disengaged from the barrel tends to swing it automatically out of the vertical operative position and hold it away from the barrel, and a latch for automatically limiting the upward movement of the sealing head, substantially as specified.

5. In a barrel filling machine, the combination with a filling mechanism comprising a filling tube, a valve for closing said filling tube, a valve stem, of a dash-pot movable with the filling tube and containing a piston, said piston being connected to the valve stem so that the valve will be held normally closed by a fluid pressure, and means for moving said dash-pot piston to open the valve, substantially as specified.

6. In a barrel filling machine, the combination with a filling mechanism mounted upon a swinging frame, a sealing head supporting rods slidable through the swinging frame, of a latch on the swinging frame adapted to engage the rods and hold the sealing and filling mechanism in any desired position, substantially as specified.

7. In a barrel filling machine, the combination of a filling tube, a cylinder and piston for operating the filling tube, a swinging frame upon which this mechanism is supported, a sealing head upon which is supported rods slidable through the swinging frame, a latch on the swinging frame adapted to engage the rod to limit the rise of the sealing head, and means to automatically swing the filling tube and sealing head out of the vertical operative position and away from the barrel, substantially as specified.

8. In a barrel filling machine, the combination of a cylinder containing a piston, a piston rod, a filling tube connected to the piston rod and adapted to be moved up and down by said piston, a valve of larger area than the filling tube at its lower end for closing the filling tube, a valve stem, a dash-pot containing a piston of a lesser area than the cylinder piston connected to the valve stem and adapted to hold the valve normally closed, of a sealing head surrounding the filling tube having a tubular extension into the barrel whereby on the withdrawal of the filling tube from the barrel the valve will engage the tubular extension and lift the sealing head away from the barrel, substantially as specified.

HARRY W. COLBY.

Witnesses:
 PEARL ABRAMS,
 H. M. MUNDAY.